ly, is of any ordinary well known construction
UNITED STATES PATENT OFFICE.

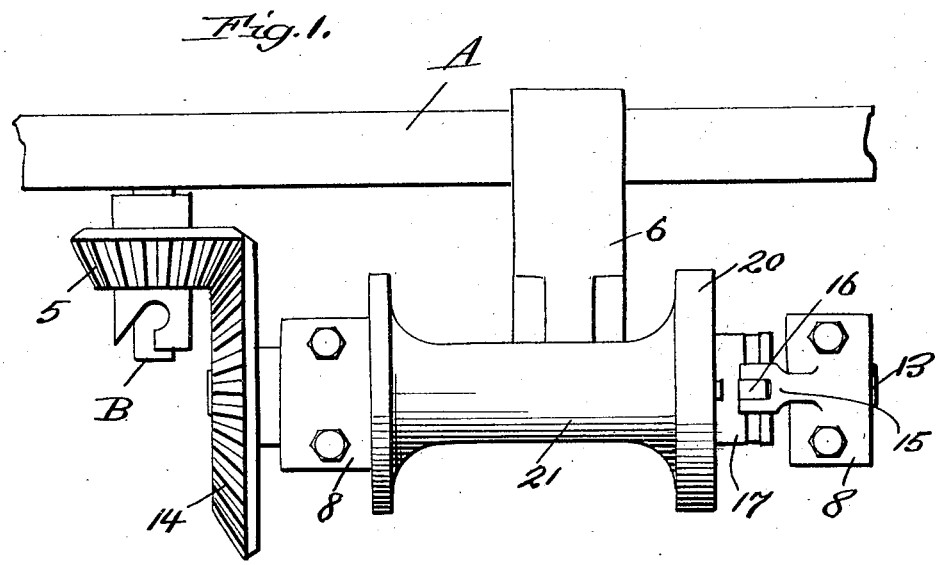
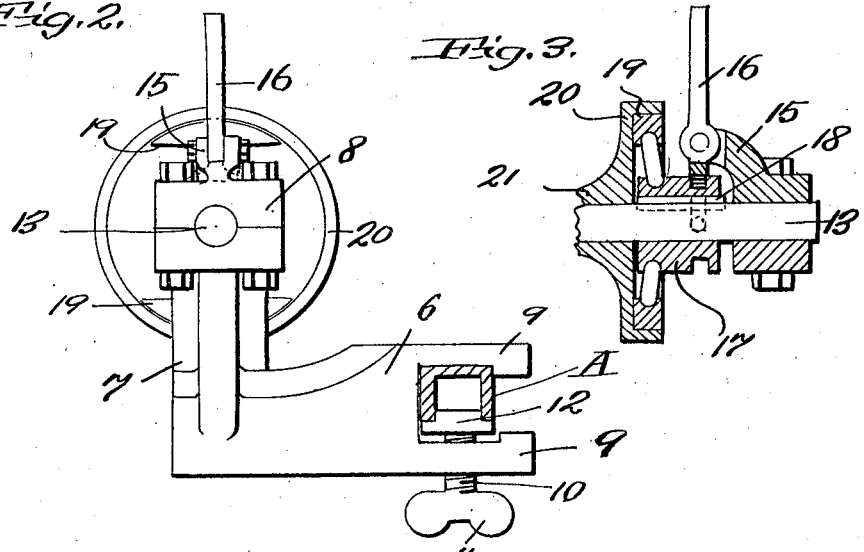

ALBERT BAYS, OF BENTON, ILLINOIS.

DRAFT ATTACHMENT FOR WHEELED VEHICLES.

1,335,639.  Specification of Letters Patent.  Patented Mar. 30, 1920.

Application filed June 30, 1919. Serial No. 307,623.

*To all whom it may concern:*

Be it known that I, ALBERT BAYS, a citizen of the United States, residing at Benton, in the county of Franklin and State of Illinois, have invented certain new and useful Improvements in Draft Attachments for Wheeled Vehicles, of which the following is a specification.

The invention relates to a draft attachment for wheeled vehicles, and more particularly to the class of draft rigging for stalled automobiles, such as pleasure cars, trucks or the like.

The primary object of the invention is the provision of an attachment of this character wherein an automobile when stalled in mud or in a rut can be pulled therefrom by the power from the motor of the automobile, the power from the motor being transmitted to a windlass or drum for the automatic winding of a draft or anchor cable thereon, the latter being anchored in the ground at a point in advance of the stalled automobile, so that said automobile will be drawn forwardly to disengage the same from the mud or rut.

Another object of the invention is the provision of an attachment or rigging of this character, wherein the same is of novel construction, so that it can be readily attached to the frame of the automobile and to the crank shaft of the motor therein for operation to release a motor vehicle from mud or a rut, when the same has become stalled therein.

A further object of the invention is the provision of an attachment or rigging of this character, which is comparatively simple in construction, very reliable and efficient in its operation, strong, durable and inexpensive to manufacture and install.

With these and other objects in view, the invention consists of the features of construction, combination and arrangement of parts, as will be hereinafter fully described in detail, illustrated in the accompanying drawings and pointed out in the claim hereunto appended.

In the accompanying drawings:

Figure 1 is a fragmentary plan view of the front end portion of the frame of an automobile, showing the draft rigging or attachment constructed in accordance with the invention applied thereto.

Fig. 2 is a side elevation thereof.

Fig. 3 is a detail vertical sectional view taken through a portion of the windlass or drum, the clutch for controlling the same and the bearings therefor.

Similar reference characters indicate corresponding parts throughout the several views in the drawings.

Referring to the drawing in detail, A designates generally a portion of the forward end of the truck frame of a motor vehicle, and B the cranking end of the driving shaft of its motor (not shown) which is of any ordinary well known construction employed for the propelling of the vehicle as usual.

Carried upon the cranking end B and adapted to rotate therewith is a beveled pinion 5 for connection therethrough with the motor of a draft rigging or attachment, which comprises a bracket formed with a main arm 6 and a yoke 7 having spaced bearings 8, the arm 6 being provided with spaced jaws 9 for receiving therebetween the forward end cross piece of the frame A. Threaded in one of the jaws 9 is a binding screw 10 having a winged head 11 and this screw plays upon a follower 12 which also engages with the cross piece of said frame A so that the arm 6 can be securely and firmly mounted upon the frame.

Journaled in the bearings 8 of the yoke 7 is a counter shaft 13 which on the inner end thereof has fixed thereto a beveled gear 14 meshing with the pinion 5 so that motion from the driving shaft of the motor in the vehicle through the instrumentalities of the meshing pinion and gear will be imparted to the countershaft 13 as will be clearly apparent from Fig. 1 of the drawing.

Formed on the outer bearing 8 is a hanger 15 in which is pivotally mounted a throw lever 16 suitably engaged with a clutch controlling sleeve 17 splined or keyed at 18 to the countershaft 13 for sliding movement thereon and rotation therewith, the connection of the throw lever 16 with the sleeve 17 being such so as not to interfere with the free rotation of said sleeve 17 with the countershaft 13 and this sleeve 17 has suitable connection with a friction clutch shoe 19 fitted within the clutch end 20 of a windlass or drum 21 loosely journaled upon the countershaft 13 and thereby making the latter fast upon the countershaft 13 to be rotated therewith. On reverse movement of the throw lever 16 the clutch controlling sleeve 17 is moved in a direction to release the friction shoe 19 from engagement with the clutch end 20 of the drum or windlass to free the same from the countershaft 13 whereby the latter will rotate independently of the windlass or drum 21 which will be free therefrom.

Adapted to be fastened to the windlass or drum 21 is one end of a draft anchor cable (not shown) which at its opposite end is adapted to be anchored in any suitable manner at a point forwardly of the automobile when stalled in mud or in rut, so that when the windlass or drum 21 is fast upon the countershaft 13 and the motor of the automobile is started the said draft or anchor cable will be caused to wind upon the windlass or drum and thereby effect the forward travel of the automobile directly from the power of the motor therein.

It will be clearly obvious that the brackets including the arm 6 and yoke 7 can be readily detached from the frame A of the motor vehicle and the draft rigging or attachment placed within the body of the vehicle to be stored in the least possible space when not in use. Furthermore the bracket will permit the proper adjustment of the rigging or attachment upon the frame A of the motor vehicle when the said rigging or attachment is to be used for the pulling of the motor vehicle out of the mud or from within a rut.

It is to be understood that changes, variations and modification may be made in the invention, such as come properly within the scope of the appended claim, without departing from the spirit of the invention or sacrificing any of its advantages.

From the foregoing it is believed that the construction, manner of application and operation of the draft rigging or attachment will be clearly understood and therefore a more extended explanation has been omitted.

What I claim is:

An attachment of the character described comprising a substantially L-shaped bracket having a recess opening through one end to form spaced opposite jaws adapted to receive therebetween the forward end of a motor vehicle frame, a clamping block arranged between the jaws to engage said frame, an adjusting screw engaged in one of the jaws and connected with the block to move the same, the other end portion of the bracket being forked, bearings on the extremities of the fork, a drum journaled in said bearings, a motor driven shaft loosely supporting the drum, and means on one of the bearings for making fast the drum on said shaft and also to permit the freeing of the drum from said shaft.

In testimony whereof I affix my signature hereto.

ALBERT BAYS.